United States Patent [19]

Cogswell et al.

[11] Patent Number: 4,541,884
[45] Date of Patent: Sep. 17, 1985

[54] METHOD OF PRODUCING FIBRE-REINFORCED COMPOSITION

[75] Inventors: Frederic N. Cogswell, Welwyn Garden City; Philip A. Staniland, Tewin Wood, both of England

[73] Assignee: Imperial Chemical Industries, PlC, England

[21] Appl. No.: 518,286

[22] Filed: Jul. 28, 1983

Related U.S. Application Data

[63] Continuation-in-part of Ser. No. 341,186, Jan. 20, 1982, abandoned.

[30] Foreign Application Priority Data

Jul. 28, 1982 [GB] United Kingdom ............... 8221753

[51] Int. Cl.$^4$ .......................... B32B 5/02; B05D 1/00
[52] U.S. Cl. ................................. 156/166; 156/181; 427/434.6
[58] Field of Search ............... 156/166, 167, 180, 181; 264/136, 137; 427/352, 385.5, 389.8, 434.6

[56] References Cited

U.S. PATENT DOCUMENTS

| | | | |
|---|---|---|---|
| 2,526,945 | 10/1950 | Gray | 264/137 |
| 2,929,738 | 3/1960 | Bateson et al. | 117/103 |
| 3,151,011 | 9/1964 | Troeleman et al. | 156/180 |
| 3,154,908 | 11/1964 | Cilker et al. | 57/35 |
| 3,367,814 | 2/1968 | Weiner et al. | 156/166 |
| 3,785,916 | 1/1974 | Turton et al. | 156/243 |
| 4,058,581 | 11/1977 | Park | 264/136 |
| 4,168,194 | 9/1979 | Stiles | 156/166 |
| 4,268,577 | 5/1981 | Fahey | 428/394 |
| 4,269,953 | 5/1981 | Brand . | |
| 4,298,653 | 11/1981 | Maaghul | 428/378 |

FOREIGN PATENT DOCUMENTS

| | | | |
|---|---|---|---|
| 263156 | 5/1960 | Australia | 264/137 |
| 0013244 | 12/1979 | European Pat. Off. . | |
| 1629830 | 4/1964 | Fed. Rep. of Germany . | |
| 2129163 | 6/1970 | Fed. Rep. of Germany . | |
| 1259085 | 2/1970 | United Kingdom . | |
| 1302048 | 6/1970 | United Kingdom . | |
| 1352391 | 6/1971 | United Kingdom . | |
| 0056703 | 12/1982 | United Kingdom . | |

OTHER PUBLICATIONS

Cagle, Handbook of Adhesive Bonding, McGraw-Hill Book Co., 1973, Chapter 8, (pp. 8-1,2,5,7,30), Hot Melt Adhesives.

*Primary Examiner*—Michael Ball
*Attorney, Agent, or Firm*—Cushman, Darby & Cushman

[57] ABSTRACT

A process of producing a fibre-reinforced composition comprising drawing a plurality of continuous filaments through a melt comprising a mixture of a thermoplastic polymer and a plasticizer for the polymer in the weight ratio between 1:4 and 99:1 of polymer to plasticizer, preferably in the weight ratio 1:1 to 19:1, the plasticizer being thermally stable at least up to the temperature of the melt and having volatility characteristics such that the plasticizer can be volatilized from the composition below the decomposition temperature of the composition but has a sufficiently low volatility at the temperature of the melt to plasticize the polymer in the melt and give a melt of reduced viscosity compared with the melt viscosity of the polymer alone. The process enables higher molecular polymers to be used in the pultrusion process and enables higher fibre contents to be achieved.

13 Claims, No Drawings

METHOD OF PRODUCING FIBRE-REINFORCED COMPOSITION

This application is a continuation-in-part of application Ser. No. 341 186 filed Jan. 20, 1982 now abandoned. The present invention relates to a method of producing fibre-reinforced compositions in which long fibres are contained in a thermoplastic polymer matrix.

Processes are known in which a fibre-reinforced composition is produced in a continuous manner by pulling a continuous tow or roving of fibres through a bath of low viscosity thermosettable resin to impregnate the fibres. The impregnated composition is subsequently cured by heating. Although the products produced have found great utility as constructional materials they lack the versatility of products impregnated with thermoplastic polymers in that once the product has been cured it is extremely difficult to form an article of a different shape from the cured product. There has been no significant development of a comparable continuous process using a thermoplastic polymer. The use of melts of thermoplastic polymers does not give a satisfactory product because the viscosity of the melt of a polymer of normal molecular weight is too high to allow rapid impregnation of a fibre tow or roving. Limited use has been made of solutions of thermoplastics, particularly in non-continuous processes where a fibre mat is impregnated with a solution and subsequently compression moulded. There are severe restraints on the use of a solution process in continuous process because of the difficulties in preparing a solution containing more than about 20% of polymer and the subsequent difficulty in removing and recovering the large quantities of solvent involved with such dilute solutions. A method has been proposed in U.S. Ser. No. 341 186 of using low molecular weight thermoplastic polymers which inherently are of low viscosity (preferably below 30 Ns/m$^2$). Such polymers give rise to good fibre wetting and compositions of surprisingly high mechanical properties. However, such polymers generally have to be made as speciality polymers because the commercially available grades are of such a high molecular weight that their melt viscosities at any temperature below their decomposition temperature is too high for adequate fibre impregnation particularly where high loading of fibre, for example at least 50% by volume of fibre is required. Typically, commercially available thermoplastic polymers have a melt viscosity of at least 100 Ns/m$^2$. It is increasingly difficult to achieve adequate fibre wetting at high fibre concentrations particularly in a continuous process as the melt viscosity increases above 100 Ns/m$^2$.

A continuous process has now been devised for producing fibre-reinforced products in which it is possible to get an excellent level of fibre wetting by the polymer melt even though a high molecular weight product is used and in which high fibre loadings are achieved.

Accordingly there is provided a process of producing a fibre-reinforced composition comprising drawing a plurality of continuous filaments through a melt comprising a mixture of a thermoplastic polymer and a plasticiser for the polymer in the weight ratio between 1:4 and 99:1 of polymer to plasticiser, preferably in the weight ratio 1:1 to 19:1, the plasticiser being thermally stable at least up to the temperature of the melt and having volatility characteristics such that the plasticiser can be volatilised from the composition below the decomposition temperature of the thermoplastic polymer but has a sufficiently low volatility at the temperature of the melt to plasticise the polymer in the melt and give a melt of reduced viscosity compared with the melt viscosity of the polymer alone. It is not, in fact, essential to remove all volatilisable plasticiser from the composition. Compositions containing some residual plasticiser, for example up to 5% by weight of the composition, can be formed into shaped articles having acceptable mechanical properties. Generally at least 0.1% by weight of plasticiser remains present in the structure.

By a "plasticiser" in the context of this invention is meant a material which will enable a melt to be obtained from a polymer having a lower melt viscosity than that of the polymer alone measured under the same conditions. Although the combination of polymer and plasticiser will normally exist as one phase this is not essential and more than one phase may exist.

It is an essential feature of the invention that the polymer in the mixture is present in melt form. The temperature of the melt must be above the glass transition temperature (Tg) of the polymer component. In the case of a crystalline polymer its melting point may be well above its Tg so that the temperature of the melt must be well above the Tg of the polymer employed. It is not necessary in every case that the temperature of the melt mixture is above the melting temperature of the polymer itself because in some cases the plasticiser will lower the melting point of the polymer.

By the term "continuous fibres" or "plurality of continuous filaments" is meant any fibrous product in which the fibres are sufficiently long to give a roving or tow of sufficient strength, under the processing conditions used, to be hauled through the molten polymer without the frequency of breakage which would render the process unworkable. Suitable materials are glass fibre, carbon fibre, jute and high modulus synthetic polymer fibres. In the latter case it is important that the polymer fibres conform to the proviso of having sufficient strength to be capable of being hauled through the polymer melt without breakage disrupting the process. In order to have sufficient strength to be hauled through the impregnation system without breakage the majority of the continuous fibres of the fibrous product should lie in one direction so that the fibrous product can be drawn through molten polymer with the majority of the continuous fibres aligned. Fibrous products such as mats made up of randomly disposed continuous fibrous are not suitable for use in the invention unless they form part of a fibre structure in which at least 50% by volume of the fibres are aligned in the direction of draw.

The continuous fibres may be in any form having sufficient integrity to be pulled through the molten polymer but conveniently consist of bundles of individual fibres or filaments, hereinafter termed "rovings" in which substantially all the fibres are aligned along the length of the bundles. Any number of such rovings may be employed. In the case of commercially available glass rovings each roving may consist of up to 8000 or more continuous glass filaments. Carbon fibre tapes containing up to 6000 or more carbon fibres may be used. Cloths woven from rovings may also be suitable for use in the present invention. The continuous fibres may be provided with any of the conventional surface sizes, particularly those designed to maximise bonding between the fibre and the matrix polymer.

A particular advantage of invention over the use of low viscosity polymer melts is that for a given proportion of impregnating medium to fibre the present invention gives a higher fibre content composition because of the eventual removal of the plasticiser from the impregnating medium whilst retaining the advantage of excellent wetting of the fibre, with consequent advantages in mechanical properties.

Compositions according to the process of the invention contain at least 30% by volume, preferably at least 40% by volume and desirably at least 50% by volume of reinforcing fibres.

It is to be understood that the invention is not limited to the use of high molecular weight polymers, that is those having a melt viscosity of more than 100 $Ns/m^2$ measured at zero shear rate at a temperature below the decomposition temperature of the polymer. The invention is also very useful when applied to low viscosity polymers because of the improvements that can be obtained in respect of ease of running stability of the continuous process and the higher fibre contents achievable.

Although the process can be applied by using a melt bath of the polymer/plasticiser mixture, through which the continuous tow or roving is pulled over at least one spreader surface, such a melt bath presents a disadvantage in respect of the containment of vaporised plasticiser. U.S. Ser. No. 341 186 describes an impregnation process in which the amount of molten polymer present at a given time is minimised. By adapting this preferred process the amount of mixture present as a melt at any given time is minimised by using a process in which the continuous roving or tow is formed into a band comprising substantially contiguous filaments which are pulled over a spreader surface, preferably a heated spreader surface, to form a nip between the band and the spreader surface and a molten mixture of polymer and plasticiser is provided at the nip. In an alternative process at least part of the heat required to provide a molten mixture is provided by heating the fibre directly. Impregnation of the band formed by the contiguous filaments is effected by tensioning the continuous band so that positive pressure is applied on the polymer melt by the band as it is pulled over the spreader surface. The mixture of polymer and plasticiser supplied to the nip may take a variety of forms. It may, for example, comprise a dry blend of polymer powder and plasticiser or a melt of the mixture prepared externally, for example in a screw extruder and metered as a melt to the nip. Yet again, the band of contiguous filaments may have been provided on one or both sides with a coating of the polymer/plasticiser mixture which is caused to impregnate the band and wet the filaments after the polymer has been melted and the coated band is biassed against at least one spreader surface, which is preferably a heated spreader surface. The coating may be in the form of a preformed film or tape of the polymer containing plasticiser or may be separate films of polymer and plasticiser which are fed in loose contact with the contiguous band of filaments and are impregnated into the band by biassing against a spreader surface, sufficient heat being supplied to melt the preformed films.

In one embodiment of the process of using a band of contiguous filament the continuous filaments are most suitably tensioned and aligned by pulling them from rolls or reels over a series of spreader surfaces, such as the surfaces of rods. This enables bundles of filaments to be spread out as far as possible into individual filaments which are under considerable tension. These filaments are guided to provide a band of contiguous filaments as they pass over a spreader surface. The shape of the spreader surface and the angle of contact of the filament band with the surface should be such as to provide a nip between the band and the heated spreader surface. The mixture of thermoplastics polymer and plasticiser is fed to the nip and sufficient heat is supplied to the system to provide a melt of the mixture at the nip. The melt impregnates and wets the fibres of the band as the band passes over the spreader surface by virtue of positive pressure between the band and the spreader surface.

This process may be further modified by providing at least one further spreader surface with which the at least partially melt impregnated fibre band forms a second nip by means of which a further supply of melt may be impregnated into the fibre band. Either surface of the partially impregnated band can be used to form the working surface of the nip.

The amount of polymer in the reinforced structure is controlled to a large extent by the tension in the band and the length of path over which the band contacts the spreader surface. Thus where the band is under high tension and contacts the spreader surface over a substantial area, so that the band is strongly urged against the spreader surface, the polymer content of the reinforced structure will be lower than under low tension/short contact path conditions.

The spreader surfaces and any subsequent surfaces used to improve impregnation or to improve surface finish are preferably in the form of cylindrical bars or rollers. These may be stationary or capable of either free or driven rotation. For example, the first impregnation surface may be a freely rotating roller which will be caused to rotate by the band at the speed of the band so that attrition of the fibre prior to impregnation or sizing by the melt is reduced to a minimum. It has been observed that if the first roll is rotated (either freely or driven) in the direction of the movement of the fibre at up to the speed of the fibre any accumulation of loose fibre on the band is carried through the system. This self-cleaning action is particularly useful in preventing an accumulation of fibre at the first roll which could cause splitting of the band. After the band has been impregnated with some of the melt mixture, preferably after being provided with further molten mixture on the other side of the band by means of a second freely rotatable heated surface, the fibre is much less susceptible to attrition and may be subjected to treatments to improve wetting of the fibres. Thus the polymer-containing band may be passed over at least one roller driven in a direction opposite to that of the travel of the band to increase the local work input on the band and maximise wetting. In general, the degree of wetting and the speed of the process may be increased by increasing the number of surfaces at which there is a work input.

After the plurality of continuous fibres have been impregnated means may be provided for increasing the temperature of the melt mixture present in association with the continuous fibres so that the plasticiser can be volatilised from the fibre-reinforced structure being pulled through. Means may also be provided for final consolidation of the fibre-reinforced structure whilst it is still at an elevated temperature. In practice it has surprisingly been found that with suitable plasticisers it is not necessary to make any special provision for increasing the temperature after the impregnation stage to remove the plasticiser. It has been found that it is possible to provide a supply of the polymer/plasticiser mixture in the form of a melt, to bring about a substantially complete impregnation of a band of contiguous filaments by the melt using at least one spreader surface, preferably heated spreader surfaces, against which the band is biassed, with the result that the resulting fibre-reinforced structure is substantially free of plasticiser, i.e. less than 5% by weight by the time that the impregnation of the band is complete. Although it is preferred that the spreader surface is heated, at least some of the heat necessary for keeping the mixture molten may be supplied by direct heating of the fibre itself.

Whether or not it is necessary to provide additional heating means to remove residual plasticiser it is advisable to provide means for containing and recovering the volatilised plasticiser. The plasticisers used in the invention will normally be high boiling point materials, particularly when they are used in conjunction with high melting point aromatic polymers. Such materials are normally solid at ambient temperature and therefore condense readily on cooled surfaces and may be recovered by being scraped off. This provides a much more convenient process than is involved in the recovery of materials which are liquids at ambient temperature.

A further advantage of the process employing a band of fibre to form a nip, over the process which requires the use of a bath of the molten mixture, is that of reducing the risk of degradation. Thus the relatively small amount of melt mixture present in the nip between the fibre band and the spreader surface ensures that large quantities of polymer are not held at an elevated temperature for prolonged periods. Provision can also be made to include a scraper blade at positions at which the melt mixture is fed to the nip to remove any excess polymer which might accumulate during processing and which might be subject to thermal degradation.

The impregnated band produced by the process of the invention may be subjected to further treatments depending on the intended shape and purpose of the end product. The separated filaments in the impregnated band may, for example, be drawn together through a die to provide a profile of considerably greater thickness than the impregnated band. A limited amount of shaping may be effected in such a die to provide a shaped profile.

The impregnated products of the processes hereinbefore described may be wound on rolls for subsequent use in fabrication processes requiring a continuous product or may be chopped into lengths for subsequent fabrication. The continuous lengths may be used to fabricate articles, for example, by winding the heat-softened product around a former, or, for example, by weaving a mat from tapes or strips of the product. The impregnated product may be chopped into pellets or granules in which the aligned fibres have lengths from 3 mm up to 100 mm. These may be used in conventional moulding or extrusion processes.

When glass fibre is used the fibre content of the product of the invention should be at least 50% by weight of the product to maximise the physical properties of the product. The upper limit of fibre content is determined by the amount of polymer required to wet out the individual fibres of the roving. In general it is difficult to achieve good wetting with less than 20% by weight of polymer although excellent results are obtainable using the process of the invention to incorporate 30% by weight of polymer in the fibre-reinforced composition.

The thermoplastic polymers used in the process of the invention are preferably those containing aromatic repeat units in the chain, such as polysulphones, polyethersulphones, polyetherketones, polyetheretherketones, polyarylene oxides, polyarylene sulphides, aromatic polyamides, aromatic polyesters, aromatic polycarbonates and polyetherimides. In general, the thermoplastic aromatic polymers used in the compositions of this invention comprise repeat units of the general formula

where Ar is selected from mono or polycyclic aromatic radicals and X is selected from at least one of O, S, SO$_2$, O.CO, O.CO.O, CO, —NHCO— and

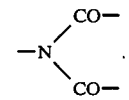

Ar and/or X may vary from unit to unit in the polymer chain.

Particularly useful are the class of polyetherketones which contain the recurring unit (I):

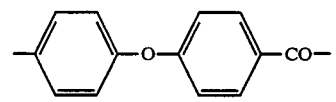

Such polymers are disclosed, inter alia, in British Patent Specification No. 1 414 421 which describes such polymers containing the unit (I) as the sole repeating unit or in conjunction with the repeating unit (II):

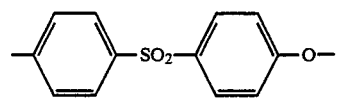

A preferred polyetheretherketone having the repeating unit (III):

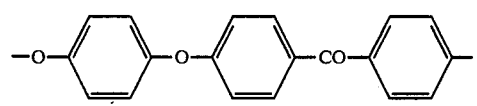

either alone or in conjunction with other repeating units is disclosed in European Patent Publication No. 1879. The other repeating units present in the polymers described in the European application may be of the repeating unit (IV):

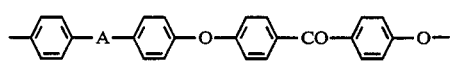

where A is a direct link, oxygen, sulphur, —SO$_2$—, —CO— or a divalent hydrocarbon radical. The repeat units may also be of formula (V):

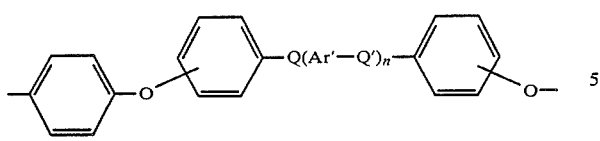

where the oxygen atom in the sub-units:

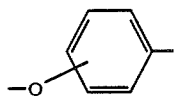

are ortho or para to the groups Q and Q', Q and Q' which may be the same or different are —CO— or —SO₂, Ar' is a divalent aromatic radical, and n is 0, 1, 2 or 3. The polymer of repeat unit III is hereinafter termed PEEK.

Another particularly useful class of compounds are the aromatic polysulphones. Thermoplastic aromatic polysulphones generally have at least some units of the structure

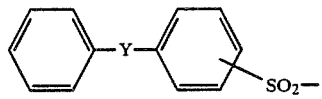

where Y is 0 or S or the residue of an aromatic diol such as a 4,4'-bisphenol. Those polysulphones containing ether linkages between some of the aromatic rings are known as aromatic polyethersulphones and may be more generally defined as polymeric material containing repeat units of the general formula

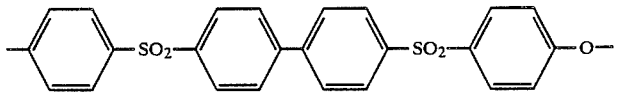

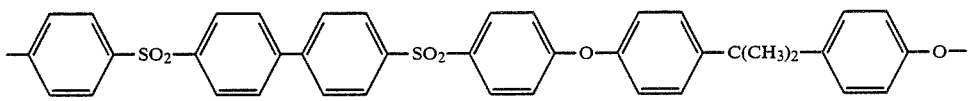

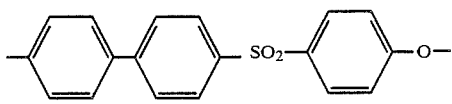

in which E is the residuum obtained by removal of the halogen atoms of a dihalobenzenoid compound in which each halogen atom is activated by an —SO₂— group ortho or para thereto, and E' is the residuum obtained by removal of the hydroxyl groups from a bisphenol. E and E' may be the same or different and indeed E and/or E' may vary from unit to unit in the polymer chain.

Where E is the same as E', it may be considered to be the residuum resulting from the removal of the halogen atom and the hydroxyl group from a halophenol in which the halogen atom is activated by an —SO₂— group ortho or para thereto. Up to 50% of the —SO₂— groups in the halophenol, dihalobenzenoid compound or bisphenol may be replaced by —CO— groups.

The residue E preferably has the structure

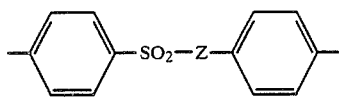

where Z is a direct link or —Ar—SO₂— where Ar is a divalent aromatic radical such as biphenylylene

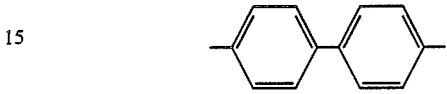

Examples of such polyethersulphones have the repeating units

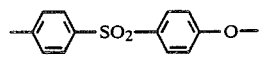

and

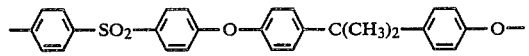

Other polymers incorporate

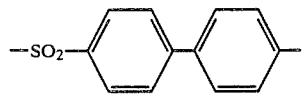

units in the polymer chain, e.g. to give the repeat units

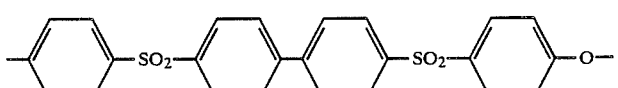

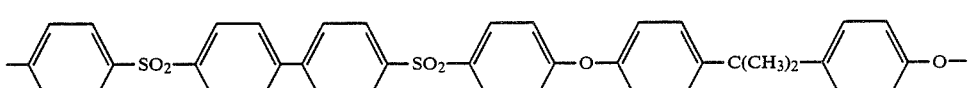

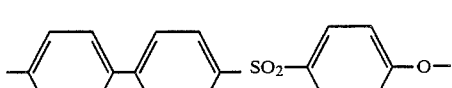

which may be present by themselves or in conjunction with repeat units such as

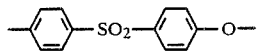

and

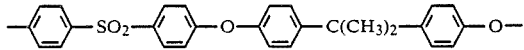

Examples of polyethersulphones and processes for their production are described in British Patent Specification Nos. 1 016 245, 1 060 546, 1 078 234, 1 109 842, 1 122 192, 1 133 561, 1 153 035, 1 153 528, 1 163 332, 1 177 183, 1 234 301, 1 264 900, 1 265 144, 1 296 383, 1 298 821 and 1 303 252, Canadian Patent Specification No. 847 963, German OLS Specification Nos. 1 938 806 and 2 433 400 and Swiss Patent Specification No. 491 981.

The plasticisers which are suitable for use in the invention are materials which are thermally stable at the elevated temperatures which are characteristic of the melting points of the thermoplastic polymers used in the invention, which can be volatilised from the composition at temperatures below the decomposition temperature of the thermoplastic polymer but which are sufficiently involatile at the temperature employed in the impregnation process to provide a plasticised polymer melt of lower melt viscosity than the polymer itself. In the case of aromatic polymers suitable plasticisers having these characteristics are found in the classes aromatic ketones, aromatic sulphones and aromatic esters. Typical high boiling materials are diphenyl sulphone, ditolyl sulphone, benzophenone, phenyl benzoate and benzyl benzoate.

The mixture of plasticiser and polymer may be provided by any conventional technique for providing mixture. For example, mixture may be a dry blend of polymer and plasticiser, a mixture which has been intimately mixed by compounding in a screw extruder, a mixture prepared by coating granules of the polymer with a solution of a plasticiser and volatilising the solvent from the coated granules or in some cases a suitable plasticiser may be used in the course of producing the aromatic polymer. Whereas in the normal course of isolating such polymer the plasticiser would need to be removed the plasticised product constitutes an ideal and cheaper raw material for the present invention than the isolated polymer.

Although the major use of the impregnated products obtained from the processes hereinbefore described is in applications requiring the use of long lengths of the products, that is greater than 100 mm long, the products find particular utility when chopped into pellets or granules in which the reinforcing fibres have a length of at least 3 mm and preferably at least 10 mm. These products may be used in the conventional fabrication process such as injection moulding and show advantages over prior art products in pellet form because the fibre length in the pellet is retained to a much greater extent in articles fabricated from the pellets of the invention than when using the prior art products. This greater retention of fibre length is believed to be a result of the greater protection afforded to the individual reinforcing filaments in the product of the invention by virtue of the good wetting by polymer which arises from use of the processes hereinbefore described.

This aspect of the invention is particularly important because it enables reinforced articles to be formed in versatile operations, such as injection moulding, which employ screw extrusion processes to melt and homogenise the feed material, with a surprisingly high retention of fibre length and consequent enhancement of physical properties. Thus the product of the invention enables moulded articles to be obtained from fabrication processes which employ screw extrusion which articles contain at least 50% and preferably at least 70% by weight of the fibres in the article of a length at least 3 mm long. This is considerably longer than currently obtainable from the commercially available reinforced products.

The products suitable for injection moulding may be used directly or may be blended with pellets of other thermoplastics products. These other products may be of the same polymer but having different molecular weight or may be of a different polymer providing that the presence of the different polymer does not adversely affect the overall balance of properties of the composition. The other products may be an unfilled polymer or may contain a particulate or fibrous filler. Blends with materials containing the conventionally produced reinforced moulding powders, that is moulding powders with reinforcing fibres up to about 0.25 mm long are particularly suitable because the overall reinforcing fibre content of the blend can be kept high to produce maximum strength even though the shorter reinforcing fibres do not contribute so effectively as the long fibres present from the product of the present invention.

The invention is further illustrated by reference to the following examples.

EXAMPLE 1

Powder samples comprising a mixture of polyetheretherketone (PEEK) of melt viscosity 110 Ns/m$^2$ (measured at 380° C. and zero shear) and diphenyl sulphone (DPS) was prepared as follows. 250 g of PEEK in powder form was wetted with a solution of diphenyl sulphone (107 g) in acetone (500 ml). The damp material was dried in a vacuum oven at 120° C. until all the acetone was removed. The resulting powder contained 70% by weight of PEEK and 30% by weight of diphenyl sulphone. Using this technique a range of compositions of varying melt viscosity were produced. These are recorded in Table 1.

TABLE 1

| Sample | Composition (wt %) PEEK | DPS | Melt viscosity at 380° C. Ns/m$^2$ |
| --- | --- | --- | --- |
| A | 100 | 0 | 110 |
| B | 90 | 10 | 55 |
| C | 80 | 20 | 28 |
| D | 70 | 30 | 14 |

The mixtures of polyetheretherketone and diphenyl sulphone thus prepared were used to impregnate continuous carbon fibres according to the following procedure. This procedure is described in European patent publication No. 56703.

8 tapes of continuous carbon fibres (supplied by Courtaulds PLC and designated XAS—O carbon fibres), each containing 12000 individual filaments were drawn at a rate of 20 cm/minute over a series of stationary guide bars to provide a band of width about 45 mm having a tension of about 50 kg. When the fibres had been guided into contiguous relationship they were pulled over a series of 4 fixed, heated, cylindrical bars of 12.5 mm diameter maintained at 400° C. The powder mixture of polyetheretherketone and diphenyl sulphone was fed to the nip formed between the carbon fibre band and the first fixed cylindrical bar. The powder melted rapidly to provide a melt pool in the nip which impregnated the fibre band passing over the bar. The structure was passed over and under the three further heated bars without the addition of further of the polymer mixture. Provision was made for extracting the fumes of diphenyl sulphone which were evolved.

The procedure was followed for each of the compositions listed above and a control run using a PEEK, without plasticiser, having a melt viscosity of 25 Ns/m$^2$ at 370° C. In addition, composition D was used in a process in which the band was hauled through at a rate of 40 cm/minute (double the rate for the other compositions). The continuous impregnated sheets produced were about 50 mm wide and about 0.1 mm thick.

Samples of those tapes which had been prepared from polymer/plasticiser mixtures were heated at 390° C. for 20 minutes to determine weight loss and to assess the extent of residual plasticiser. Weight losses of about 0.1% indicated that very little plasticiser remained in the tapes at the end of the pultrusion process.

The mechanical properties of the compositions prepared were evaluated as plaques with uniaxially disposed carbon fibres by compressing 20 layers of the tapes produced to give a sample about 2.5 mm thick, 50 mm wide and 150 mm long. The results obtained are given in Table 2.

TABLE 2

| Sample | Wt % Carbon Fibre | Flexural Modulus GN/m$^2$ | Along fibre strength MN/m$^2$ | ILS[2] MN/m$^2$ | Transverse flexural strength[3] MN/m$^2$ | Impact strength[4] Init J | Impact strength[4] Fail J |
|---|---|---|---|---|---|---|---|
| Control | 63 | 112 | 1310 | 99 | 110 | 3.7 | 8.2 |
| A | 55 | — | — | 93 | 134 | 6.1 | 13.3 |
| B | 60 | 98 | 1210 | 96 | — | — | — |
| C | 62 | 115 | 1320 | 89 | 105 | 4.8 | 10.6 |
| D | 66 | 112 | 1460 | 102 | — | — | — |
| D[1] | 63 | 112 | 1340 | 104 | — | — | — |
| SD | 4 | | 50 | 3 | 10 | | |

[1]Impregnated at double line speed (40 cm/min).
[2]Interlaminar shear strength according to ASTM D2344-72 using a span to sample thickness ratio of 5:1.
[3]Measured according to ASTM D790-80.
[4]Instrumented falling weight impact test using a dart of 12.7 mm in diameter and using a 40 mm diameter support ring, normalised to 3 mm thickness. This test is described by C J Hooley and S Turner (Mechanical Testing of Plastics Institute of Mechanical Engineers June/July 1979, Automotive Engineer).

The results obtained indicate little difference in the levels of properties but a qualitative difference was observed in the manner of failure in the interlaminar shear test. In this test samples B, C and D showed less evidence of delamination.

EXAMPLE 2

The procedure of Example 1 was followed to produce an impregnated carbon fibre tape (designated Sample A) using a sample of 'Victrex' PES 500P, a polyethersulphone available from ICI PLC, not containing any plasticiser, and having a melt viscosity of 500 Ns/m$^2$ at 350° C. and a viscosity of 170 Ns/m$^2$ at 400° C. Under optimum conditions the maximum fibre content which could be achieved with reasonably good wetting was 58% by weight. Using these optimum conditions a sample of the same polyethersulphone powder (100 parts) was dry blended with diphenylsulphone powder (30 parts) for use as the impregnation melt. It was possible to prepare a well wetted tape with a carbon fibre content of 65% (designated Sample B). The process was observed to run more smoothly than with the unplasticised PES and less attrition of the carbon fibre was observed.

A further impregnated carbon fibre sheet (designated Sample C) was prepared using a low molecular weight polyethersulphone (having a melt viscosity of 4 Ns/m$^2$ at 350° C.) as the resin phase. The procedure of Example 1 was used, with all the bars maintained at 350° C.

The products obtained from these three experiments were formed into plaques with uniaxial carbon fibres by pressing 20 superimposed samples of the sheet at a temperature of 350° C. It was observed that during pressing of the sample containing the low molecular weight PES resin some of the resin was squeezed out from the plaque giving a higher fibre content than the individual sheet of the superimposed layers. The samples were tested in flexure at 23° C. and the results are quoted below in Table 3.

TABLE 3

| Sample | Fibre content by weight | Axial direction Modulus GN/m$^2$ | Axial direction strength MN/m$^2$ | Transverse direction strength MN/m$^2$ |
|---|---|---|---|---|
| A | 58% | 92 | 920 | 49 |
| B | 65% | 119 | 1132 | 78 |
| C | >62% | 127 | 1204 | 25 |

The axial properties are dominated by fibre content. The transverse properties however are dictated by the resin phase and, as expected, the higher molecular weight commercial resins have superior transverse properties. However, in addition to the superiority of the high molecular weight sample, the sample prepared by the plasticiser route is markedly superior to those prepared without.

EXAMPLE 3

The procedure used in Example 1 was following with all four impregnation bars set at 380° C., and the equipment was run with minimum constraint to give the greatest ease of running. The resin used was a specially prepared polyetheretherketone (PEEK) having a melt viscosity of 25 Ns/m$^2$ at 380° C. This resin was run by itself and as a blend based on 100 parts by weight of PEEK to 100 parts by weight of DPS.

A length of the carbon fibre without any resin was weighed and compared with the weight per unit length of the tapes so formed.

TABLE 4

| | Tape weight per meter gms | Resin weight per meter gms | Fibre content % |
|---|---|---|---|
| Carbon fibre | 6.3 | 0 | 100% |
| Tape based on PEEK | 14.0 | 7.7 | 45% |
| Tape based on PEEK + DPS | 10.1 | 3.8 | 62% |

These results indicate the greater ease of obtaining high fibre loadings by the use of a plasticiser even in the case where the polymer used is of low molecular weight.

EXAMPLE 4

46 tapes of 6000 filaments of Courtaulds XAS-N fibre were drawn over a series of four impregnation bars controlled at temperature in the range 360° C. (first bar) up to 440° C. (last bar) to give a tape 120 mm wide at a speed of 250 mm/minute. The fibres were impregnated with a PEEK resin having a melt viscosity of 25 Ns/m$^2$ at 380° C., however, it was extremely difficult to maintain continuous running of the process without significant fibre attrition or splits when attempting to achieve a loading of 63% by weight of fibre. This problem is believed to be associated with the particular size on the XAS-N fibres which degrades and contaminates the impregnation bars. The efficiency of the process was less than 20% because of the need to stop and clean down the apparatus and the need to discard material with more than one split or with badly abraded fibrous lumps.

It was possible to obtain above 80% efficiency when running at fibre contents of 51% by weight. With the equipment set for such stable running, mixtures of the same polymer with various concentrations of diphenyl sulphone plasticiser were evaluated in turn. The DPS boiled off during the latter stages of impregnation to give a sheet substantially free from plasticiser. The following fibre contents were achieved.

TABLE 5

| Feed mixture | | Wt % carbon fibre | Quality |
|---|---|---|---|
| PEEK | DPS | in tape | (subjective assessment) |
| 100 | 0 | 51% | Good |
| 75 | 25 | 57% | Very good |
| 63 | 37 | 64% | Very good |
| 50 | 50 | 69% | Very good |

EXAMPLE 5

The procedure of Example 1 was repeated using a polyetheretherketone, not mixed with plasticiser, having a melt viscosity at 370° C. of 25 Ns/m$^2$, to produce a carbon fibre reinforced (Courtaulds XAS-N carbon fibre) sheet having a fibre content of 62% by weight. As in Example 1 the tension in the band of contiguous fibres was about 50 kg.

The procedure was repeated using a mixture of the same PEEK powder and diphenyl sulphone in a weight ratio of 2:1. The procedure also differed in that the tension in the band of fibres was reduced to about 25 kg. It was observed that the latter procedure permitted a smoother running process requiring less attention by the operator. The products obtained were evaluated according to the procedure of Example 1. The following comparative results were obtained.

TABLE 6

| | Non-plasticised process | Plasticised process |
|---|---|---|
| Flexural modulus (GN/m$^2$) | 115 | 115 |
| Flexural strength (MN/m$^2$) | 1191 | 1422 |
| Interlaminar shear strength (MN/m$^2$) | 81 | 104 |

The results indicate that improved interlaminar shear strength and flexural strength are obtained from the use of plasticiser in the impregnation process.

EXAMPLE 6

Prepreg strip produced as Sample D in Example 1 (normal line speed) was woven into sheet using a tabby weave (as described in the Encyclopedia Brittanica article on weaving). Five such woven sheets were layed together such that each layer was oriented at ±45° to the layers above and below it. This stack was compression moulded at 400° C. to give a plaque about 1.5 mm thick, hereinafter referred to as a quasi-isotropic plaque. The plaque was transferred from the hot mould to a cold press at 20° C. to give a rapid cooling cycle (approx 500° C./minute). A similar plaque was moulded from the control product of Example 1. The impact strengths were measured as in Example 1, all energies being normalised to a thickness of 1.75 mm (assuming energy proportional to (thickness)$^{1.5}$) and are given in Table 7 below.

TABLE 7

| | | Impact Strength (J) | |
|---|---|---|---|
| Sample | Actual thickness (mm) | Initiation Energy | Failure Energy |
| D | 1.75 | 5.0 | 12.5 |
| Control | 1.2 | 5.2 | 14.3 |

Although there is no significant difference in the values obtained it was not that the mode of failure was different. Substantial splintering of the control sample was observed whereas plaque D did not splinter on failure.

EXAMPLE 7

The effect of cooling rate on the preparation of the quasi-isotropic plaques was compared for polymers of different molecular weight. Sample X was prepared according to the method of Example 1 using PEEK of melt viscosity 200 Ns/m$^2$ measured at 380° C. and a polymer to plasticiser weight ratio of 60:40. Samples Y and Z were prepared without the use of plasticiser from polymers of melt viscosity 25 and 6 respectively (measured at 380° C.). In each case Courtaulds XAS—O carbon fibre was used and a fibre content of approximately 62% by weight was obtained. The impact strength (by the Instrumented Falling Weight Impact Test (IFWIT) of Example 1) of the samples was measured (normalised to 1.5 mm). In addition impacted samples were examined by an ultrasonic method to determined the area of delamination damage caused by the impact.

TABLE 8

| | | | IFWIT | | | C-Scan | |
|---|---|---|---|---|---|---|---|
| | Resin | Mould | Stiffness | Energy | | Damage | |
| | Viscosity | Cooling | Gradient | Initiation | Failure | Area | |
| Sample | (Ns/m$^2$) | Rate | (N/mm) | (J) | (J) | (Cm$^2$) | Splintering |
| X | 200 | Fast* | 570 (12) | 4.4 (0.2) | 10.4 (1.8) | 3.8 (0.2) | None |
| X | 200 | Slow** | 557 (101) | 4.2 (0.3) | 9.8 (0.6) | 4.0 (0.4) | None |
| Y | 25 | Fast* | 600 (20) | 4.0 (0.2) | 10.2 (0.5) | 5.2 (0.5) | Slight |
| Y | 25 | Slow** | 800 (40) | 5.2 (0.5) | 12.5 (1.0) | 14.0 (2.0) | Severe |
| Z | 6 | Fast* | 643 (45) | 4.2 (0.5) | 10.6 (0.8) | | Severe |

Standard deviations in parenthesis.
Fast*: A fast cooling cycle involves transferring the moulded plaque from the hot mould to a cold press at 20° C. (cooling rate approximately 500–1000° C./minutes).
Slow**: A slow cooling cycle involves cooling the hot mould by a forced air flow (cooling rate approximately 10° C./minute).

EXAMPLE 8

The general procedure of Example 1 was used to prepare pultrusion from PEEK/plasticiser melts of various melt viscosities in order to compare the quality of the product with that of the control run of Example 1 and to demonstrate the applicability of the process to very high molecular weight polymer.

TABLE 9

| Resin Melt Viscosity at 380° C. (Ns/m$^2$) | % DPS | Fibre Content Vol. % | Quality of Wetting | Process Observations | Melt Viscosity of plasticised resin (Ns/m$^2$) |
|---|---|---|---|---|---|
| 200 | Zero | 53 | Good | Some splitting resin efficiency ~70% | 25 |
| 200 | Zero | 47 | Poor | Some splitting resin efficiency ~70% | 200 |
|  | 10 | 48 | Poor | Some splitting resin efficiency ~70% | 120 |
|  | 20 | 48 | Poor | Some splitting resin efficiency ~70% | 45 |
|  | 30 | 51 | Fair | Resin efficiency ~80% no splits | 25 |
|  | 40 | 55 | Good | Resin efficiency >90% no splits | 16 |
|  | 50 | 60 | Good | Resin efficiency >90% no splits | 10 |
|  | 65 | 75 | Good | Resin efficiency >90% no splits | 5 |
| 2000 | 0 |  | Not runnable |  | 2000 |
|  | 65 | 60 | Good | Resin efficiency >90% no splits | 10 |

EXAMPLE 9

The general procedure of Example 1 was used to impregnate continuous carbon fibre roving (AS4 supplied by Hercules Corp) using a polymer of methyl methacrylate ('Diakon' MG obtainable from Imperial Chemical Industries PLC) having a melt viscosity of 1200 Ns/m$^2$ at 250° C. and zero shear rate and methyl methacrylate monomer as the melt plasticiser. The procedure was carried out using a weight ratio of polymer to monomer of 1:1 at a melt temperature of 250° C. and a pull through of 30 cm/minute. A product containing 43% by weight of fibre was produced with fair impregnation. The procedure was repeated using a polymer/monomer ratio of 1:9. A well impregnated product having a fibre content of 78% was produced.

In a control run without plasticiser an attempt was made to impregnate using the acrylic polymer at a temperature of 250° C. Great difficulty in running was experienced, with frequent breaks in the carbon fibre tow because of the high melt viscosity. The product obtained (34% by weight carbon fibre) exhibited very poor wetting of the fibre by the polymer.

These prepregs were made up into sheet stock (5 layer woven (0.90/±45/0.90/±45/0.90)) and moulded at 210° C. The samples were studied in the instrumented fall weight impact test (all results normalised to 2.5 mm thick).

TABLE 10

|   | Fibre Content Wt % | Resin | Stiffness Gradient N/mm | Yield Force N | Initiation Energy (J) | Failure Energy (J) |
|---|---|---|---|---|---|---|
| A | 34 | 'Diakon' MG | 800 (50) | 2170 (200) | 4.5 (0.8) | 14.9 (0.7) |
| D | 43 | 'Diakon' MG VP | 1110 (160) | 3430 (371) | 7.1 (0.3) | 20.6 (1.4) |
| E | 78 | 'Diakon' MG VP | 1790 (160) | 5440 (180) | 8.2 (0.4) | NA |

Standard deviation in parenthesis.

EXAMPLE 10

In this experiment impregnation was achieved using a melt blend of polymer and plasticiser in an enclosed melt bath.

A single roving of Courtaulds XAS—O carbon fibre containing 12,000 filaments was drawn through an enclosed melt bath, fed from an extruder, containing a molten mixture of PEEK and diphenyl sulphone plasticiser at a weight ratio of 1:1 at a temperature of 380° C. After passing successively under and over eight spreader bars situated in the melt the impregnated roving was drawn through a sizing die of circular cross section 1.28 mm in diameter. Any excess melt was scraped off by the die giving a product containing 38% by volume of fibre in the mixture of plasticiser and polymer. The lace was subsequently flattened to a tape by drawing it over further heated spreader bars at approximately 400° C. The plasticiser was volatilised giving an impregnated tape containing 55% by volume of carbon fibre and less than 0.5% by weight of plasticiser. It was possible to achieve excellent impregnation by drawing the fibre through the bath and the die at at least 5 m/minute. The process ran without any fibre attrition at the die.

In a control experiment the same procedure was used, with the same polyetheretherketone, but without plasticiser. In order to obtain a 55% by volume content of fibres it was necessary to reduce the sizing die diameter to 1.06 mm. It was found that in order to get reasonable impregnation it was necessary to pull the fibre through at not greater than 0.3 m/minute. After about 100 m of roving had been hauled through the fibre attrition at the die caused a die blockage and a break in the roving. This behaviour could not be improved on without substantially decreasing the fibre volume content.

We claim:

1. A process of producing a fibre-reinforced composition comprising wetting a plurality of continuous filaments with a melt by drawing the filament through a melt which comprises a mixture of a thermoplastic polymer and a plasticiser for the polymer in the weight ratio between 1:4 and 99:1 of polymer to plasticiser the plasticiser being thermally stable at least up to the temperature of the melt and having volatility characteristics such that the plasticiser can be volatilized from the composition below the decomposition temperature of the thermoplastic polymer but has a sufficiently low volatility at the temperature of the melt to plasticise the polymer in the melt and give a melt of reduced viscosity compared with the melt viscosity of the polymer alone, and substantially reducing the plasticiser content of the composition while the wetted filaments are at a temperature above the glass transition temperature of the polymer alone but below the decomposition temperature of the polymer such that the plasticiser content is 5% or less by weight of the composition.

2. A process according to claim 1 wherein the melt viscosity of the polymer in the absence of the plasticiser is at least 100 Ns/m$^2$ at zero shear rate measured below the decomposition temperature of the polymer.

3. A process according to either of claim 1 or claim 2 in which the polymer/plasticiser melt is contained within a melt bath provided with at least one spreader surface over which the plurality of filaments are pulled.

4. A process according to claim 1 or claim 2 in which the impregnated plurality of fibres is spread into a thin band of contiguous filaments by biassing the plurality of fibres against at least one spreader surface and supplying sufficient heat to the band to produce a fibre reinforced structure substantially free of plasticiser.

5. A process according to either of claims 1 or 2 in which contiguous filaments which are pulled over a spreader surface to form a nip between the band and the spreader surface and a molten mixture of polymer and plasticiser is provided at the nip, impregnation of the band formed by the contiguous filaments being effected by tensioning the continuous band so that positive pressure is applied on the polymer melt by the band as it is pulled over the spreader surface.

6. A process according to claim 5 in which the polymer melt is maintained in a molten state during impregnation by supplying at least part of the heat required to at least one spreader surface.

7. A process according to claim 5 in which the polymer melt is maintained in a molten state during impregnation by supplying at least part of the heat required directly to the filaments.

8. A process according to claim 1 or claim 2 in which the thermoplastic polymer is an aromatic polymer and comprises a polymer of repeat unit of the general formula:

—Ar—X— where Ar is selected from mono or polycyclic aromatic radicals and X is selected from at least one of O, S, SO$_2$, O.CO, O.CO.O, CO, —NHCO— and

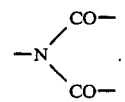

9. A process according to claim 8 in which the aromatic polymer is selected from polysulphones, polyethersulphones, polyetherketones, polyetheretherketones, polyarylene oxides, polyarylene sulphides, aromatic polyamides, aromatic polyesters, aromatic polycarbonates, and aromatic polyetherimides.

10. A process according to claim 1 or claim 2 in which the polymer is a polyetherketone or polyetheretherketone and the plasticiser is an aromatic sulphone.

11. A fibre-reinforced structure produced by the process of claim 1 or claim 2 or claim 12 and having a plasticiser content of between 0.1 and 5% by weight of the structure.

12. A process according to claim 1 wherein the fibre-reinforced composition has at least 50% by volume of reinforcing fibres.

13. A process according to claim 1 wherein any residual plasticiser in the composition is a solid at ambient temperature.

* * * * *